US008581695B2

(12) United States Patent
Carlson et al.

(10) Patent No.: US 8,581,695 B2
(45) Date of Patent: Nov. 12, 2013

(54) CHANNEL-SWITCHING REMOTE CONTROLLED BARRIER OPENING SYSTEM

(76) Inventors: Grant B. Carlson, Hammondsport, NY (US); Brett A. Reed, Alliance, OH (US)

( * ) Notice: Subject to any disclaimer, the term of this patent is extended or adjusted under 35 U.S.C. 154(b) by 719 days.

(21) Appl. No.: 12/473,083

(22) Filed: May 27, 2009

(65) Prior Publication Data

US 2010/0301999 A1 Dec. 2, 2010

(51) Int. Cl.

| | |
|---|---|
| ***H04B 1/00*** | (2006.01) |
| ***G05B 19/00*** | (2006.01) |
| ***H04L 9/32*** | (2006.01) |

(52) U.S. Cl.

USPC .......... 340/5.71; 375/132; 375/135; 375/136; 340/5.26

(58) Field of Classification Search

USPC ............... 340/5.7, 5.1, 5.61, 5.64, 5.26, 5.22; 375/132–136

See application file for complete search history.

(56) References Cited

U.S. PATENT DOCUMENTS

| | | | |
|---|---|---|---|
| 723,188 | A | 3/1903 | Tesla |
| 725,605 | A | 4/1903 | Tesla |
| 2,292,387 | A | 8/1942 | Markey et al. |
| 2,500,212 | A | 3/1950 | Starr |
| 3,090,959 | A | 5/1963 | Marmont |
| 4,066,964 | A | 1/1978 | Costanza et al. |
| 4,255,742 | A | 3/1981 | Gable et al. |
| 4,763,592 | A | 8/1988 | Russ |
| 4,850,036 | A | 7/1989 | Smith |
| 4,890,108 | A | 12/1989 | Drori et al. |
| 4,893,338 | A | 1/1990 | Pastor |
| 5,303,259 | A | 4/1994 | Loveall |
| 5,428,818 | A | 6/1995 | Meidan et al. |
| 5,473,318 | A | 12/1995 | Martel |
| 5,519,381 | A | 5/1996 | Marsh et al. |
| RE35,364 | E | 10/1996 | Heitschel et al. |
| 5,680,134 | A | 10/1997 | Tsui |
| 6,005,508 | A | 12/1999 | Tsui |
| 6,025,785 | A | 2/2000 | Farris et al. |
| 6,049,289 | A | 4/2000 | Waggamon et al. |
| RE36,703 | E | 5/2000 | Heitschel et al. |

(Continued)

FOREIGN PATENT DOCUMENTS

| | | | |
|---|---|---|---|
| GB | 2315892 | A | 2/1998 |

OTHER PUBLICATIONS

International Search Report Mailed Jul. 13, 2009 from International App. No. PCT/US09/45317.

(Continued)

*Primary Examiner* — Daniel Wu
*Assistant Examiner* — Mohamed Barakat
(74) *Attorney, Agent, or Firm* — Gardere Wynne Sewell LLP

(57) ABSTRACT

An improved barrier door one way wireless communication system for operating a barrier, such as a garage door, includes the transmission and reception of multibit code hopping data packets in combination with automatic RF channel switching. Packet data is transmitted automatically on more than one RF channels in a switching style while sending two or more redundant multibit code hopping data packets on each of the RF channels. The system also provides for the learning of a transmitter to a receiver where two or more code hopping data packets must be received and decoded by the receiver on all RF channels before a transmitter can be learned to a receiver. Once the transmitter is learned, actuation of the transmitter during a learn mode can open a window for learning of a single channel transmitter.

16 Claims, 11 Drawing Sheets

(56) References Cited

U.S. PATENT DOCUMENTS

| | | | | |
|---|---|---|---|---|
| 6,078,271 | A | 6/2000 | Roddy et al. | |
| 6,081,203 | A | 6/2000 | Fitzgibbon | |
| 6,249,673 | B1 | 6/2001 | Tsui | |
| 6,339,706 | B1 | 1/2002 | Tillgren et al. | |
| 6,384,710 | B1 | 5/2002 | LeMense et al. | |
| 6,414,587 | B1 | 7/2002 | Fitzgibbon | |
| 6,456,726 | B1 | 9/2002 | Yu et al. | |
| 6,486,795 | B1 | 11/2002 | Sobel et al. | |
| RE37,986 | E | 2/2003 | Heitschel et al. | |
| 6,609,010 | B1 | 8/2003 | Dolle et al. | |
| 6,714,605 | B2 * | 3/2004 | Sugar et al. | 375/340 |
| 6,737,823 | B2 | 5/2004 | Reed et al. | |
| 6,822,603 | B1 | 11/2004 | Crimmins et al. | |
| 6,850,910 | B1 | 2/2005 | Yu et al. | |
| 6,854,058 | B2 | 2/2005 | Carroll | |
| 6,856,237 | B1 | 2/2005 | Richmond et al. | |
| 6,903,650 | B2 | 6/2005 | Murray | |
| 6,963,267 | B2 | 11/2005 | Murray | |
| 6,990,317 | B2 | 1/2006 | Arnold | |
| 7,002,910 | B2 * | 2/2006 | Garcia-Luna-Aceves et al. | 370/229 |
| 7,034,488 | B2 | 4/2006 | Robb et al. | |
| 7,057,494 | B2 * | 6/2006 | Fitzgibbon | 340/5.7 |
| 7,061,428 | B1 | 6/2006 | Amir et al. | |
| 7,068,181 | B2 * | 6/2006 | Chuey | 340/12.5 |
| 7,173,514 | B2 * | 2/2007 | Mullet et al. | 340/5.25 |
| 7,230,518 | B2 | 6/2007 | Fitzgibbon | |
| 7,280,031 | B1 | 10/2007 | Rodriguez et al. | |
| 7,292,618 | B2 * | 11/2007 | Tal et al. | 375/132 |
| 7,327,107 | B2 | 2/2008 | Mullet et al. | |
| 7,356,068 | B2 * | 4/2008 | Park et al. | 375/132 |
| 7,375,612 | B2 | 5/2008 | Murray et al. | |
| 7,386,026 | B1 * | 6/2008 | Gold | 375/130 |
| 7,577,181 | B2 * | 8/2009 | Cornwall et al. | 375/134 |
| 7,589,615 | B2 | 9/2009 | Keller, Jr. et al. | |
| 8,295,323 | B2 * | 10/2012 | Andersson et al. | 375/134 |
| 2001/0023483 | A1 | 9/2001 | Kiyomoto | |
| 2002/0184504 | A1 | 12/2002 | Hughes | |
| 2002/0191785 | A1 | 12/2002 | McBrearty et al. | |
| 2003/0016119 | A1 | 1/2003 | Teich | |
| 2003/0056001 | A1 | 3/2003 | Mate et al. | |
| 2003/0070092 | A1 | 4/2003 | Hawkes et al. | |
| 2003/0072445 | A1 | 4/2003 | Kuhlman et al. | |
| 2003/0147536 | A1 | 8/2003 | Andivahis et al. | |
| 2003/0151496 | A1 | 8/2003 | Study et al. | |
| 2003/0177237 | A1 | 9/2003 | Stebbings | |
| 2003/0214385 | A1 | 11/2003 | Murray | |
| 2004/0019783 | A1 | 1/2004 | Hawkes et al. | |
| 2004/0052374 | A1 * | 3/2004 | Lee et al. | 380/255 |
| 2004/0066148 | A1 | 4/2004 | Oskorep et al. | |
| 2004/0066277 | A1 | 4/2004 | Murray et al. | |
| 2004/0181569 | A1 | 9/2004 | Attar et al. | |
| 2005/0058153 | A1 | 3/2005 | Santhoff et al. | |
| 2006/0132284 | A1 | 6/2006 | Murphy et al. | |
| 2006/0176148 | A1 | 8/2006 | Sommer | |
| 2006/0181428 | A1 * | 8/2006 | Blaker et al. | 340/825.22 |
| 2006/0186991 | A1 | 8/2006 | Jankovsky | |
| 2006/0250216 | A1 | 11/2006 | Gagnon | |
| 2007/0005806 | A1 | 1/2007 | Fitzgibbon et al. | |
| 2007/0006319 | A1 | 1/2007 | Fitzgibbon et al. | |
| 2007/0046231 | A1 | 3/2007 | Mullet et al. | |
| 2007/0126552 | A1 | 6/2007 | Fitzgibbon | |
| 2007/0152798 | A1 * | 7/2007 | Witkowski | 340/5.26 |
| 2007/0273472 | A1 | 11/2007 | Gregori | |
| 2007/0294961 | A1 | 12/2007 | Reed et al. | |
| 2008/0079603 | A1 | 4/2008 | King et al. | |
| 2009/0021348 | A1 * | 1/2009 | Farris et al. | 340/5.71 |
| 2009/0257473 | A1 * | 10/2009 | Tuttle | 375/132 |

OTHER PUBLICATIONS

Written Opinion Mailed Jul. 13, 2009 from International App. No. PCT/US09/45317.

* cited by examiner

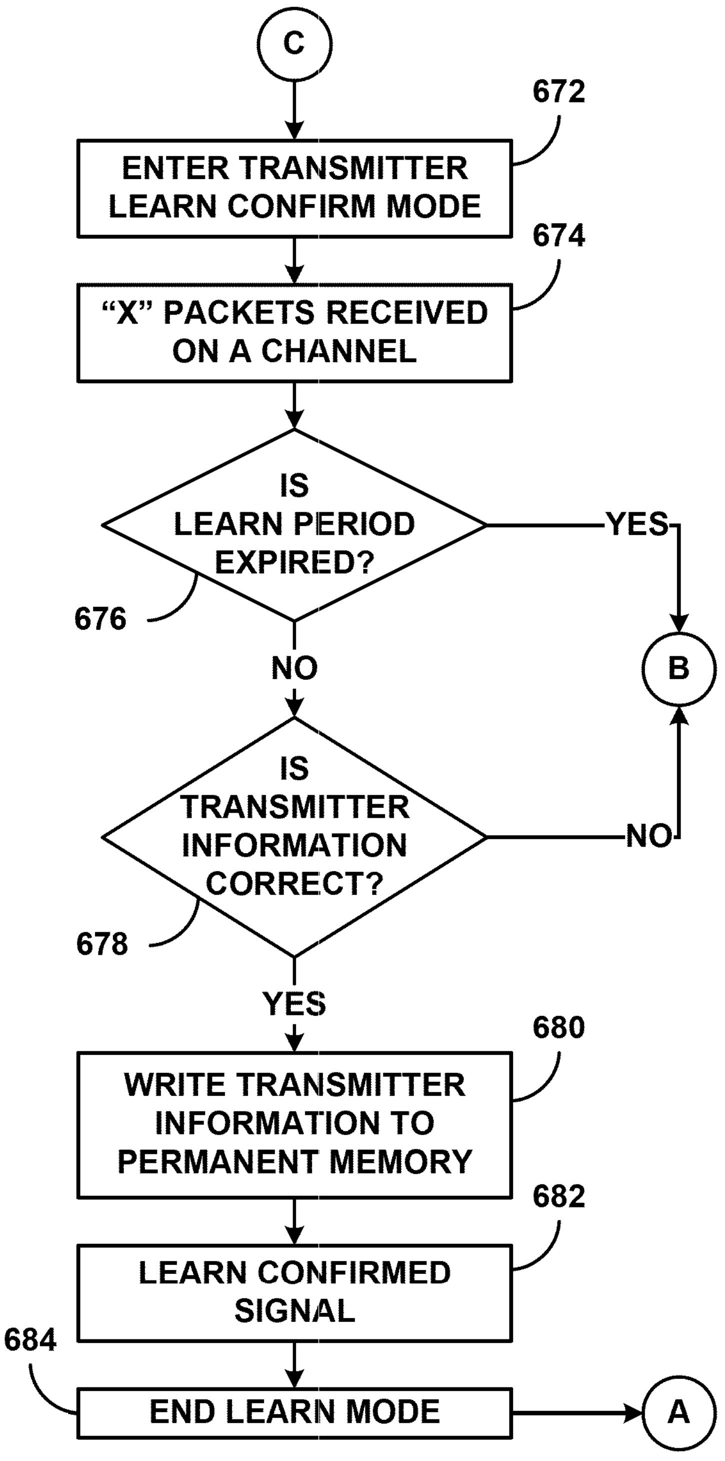
FIGURE 6(c)(ii)

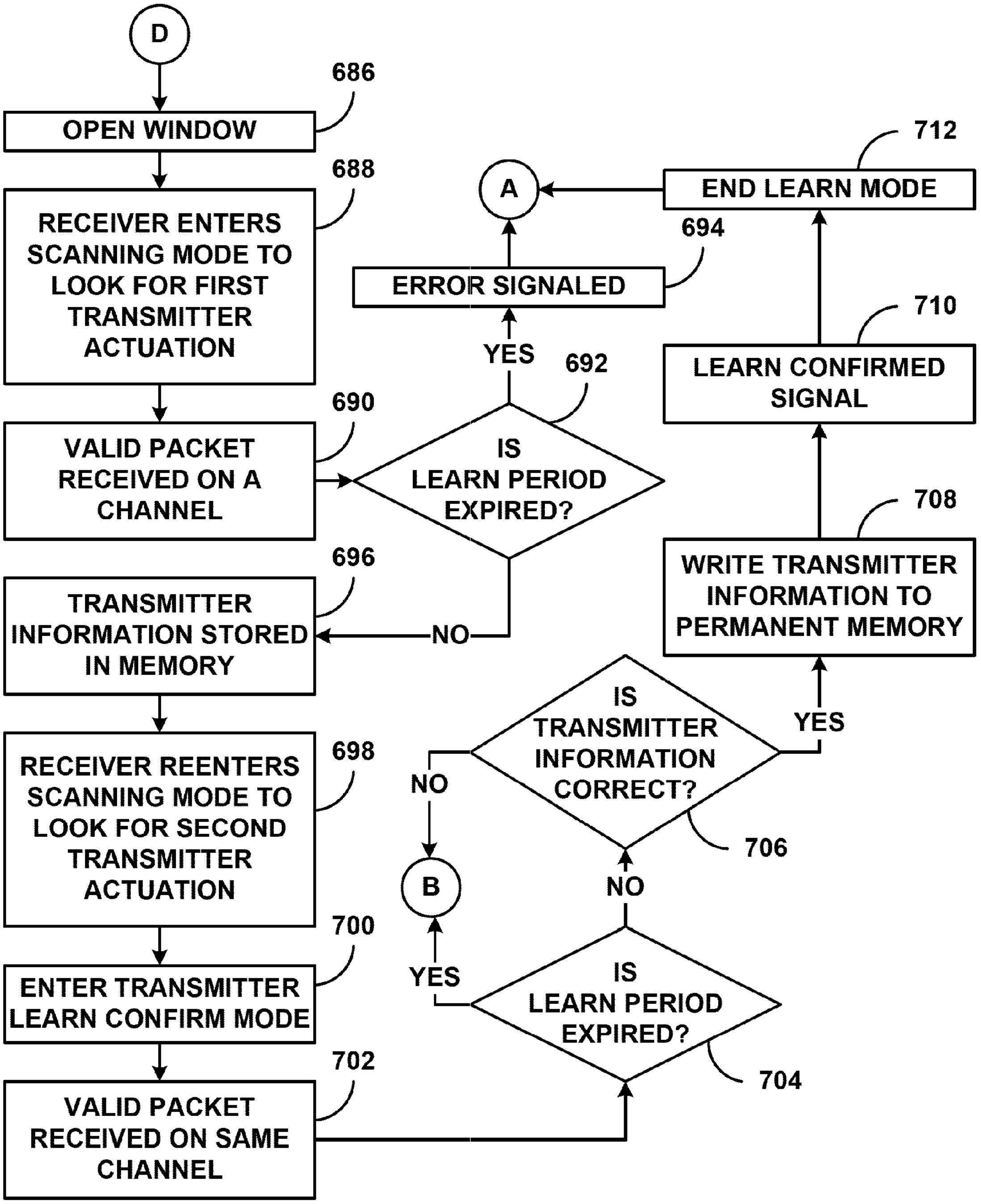
FIGURE 6(c)(iii)

CHANNEL-SWITCHING REMOTE CONTROLLED BARRIER OPENING SYSTEM

TECHNICAL FIELD

The present invention relates generally to remotely controlled barrier operator systems for opening and closing garage doors, gates and other barriers, and more particularly to improved wireless communication systems and methods for such barrier operator systems.

BACKGROUND

With few exceptions, barrier operator systems, such as those controlling upward acting sectional garage doors, so-called rollup doors, gates and other motor operated barriers, are remotely controlled devices. Typically, they are remotely controlled by one or more building mounted or hand held wireless remote control devices such as radio frequency (RF) code transmitters. These RF transmitters, upon actuation by the user, usually send access codes and commands, via packet data, to a radio frequency receiver associated with the barrier operator. A controller unit also associated with the barrier operator then receives and decodes the data from the RF receiver. Upon receiving and decoding the packet data, and verifying the access codes, the barrier operator then either opens, closes, or stops the barrier, depending upon the command.

More recently, the communication protocol between the remote RF transmitters and the RF receiver uses code-hopping encryption for the access codes, sometimes referred to as "rolling codes," to prevent code interception and unauthorized actuation of the barrier operator. Accordingly, the rolling code is transmitted as part of the packet data along a single fixed RF "channel." By "channel," as used throughout the specification and claims, is meant the communication path between the RF transmitter and RF receiver along which the encoded primary RF signal travels. Each channel will accommodate inter alia a different main radio frequency signal along with any sidebands thereof.

The rolling or hopping code changes with each new transmission in accordance with a stored algorithm to prevent unauthorized capture of the codes, its security dependent upon the secrecy of the encryption algorithm and of the secret key. A plurality of remote RF transmitters can be used to send the required access code and data to a single RF receiver integrated into the barrier operator, but in each case the transmission from each transmitter proceeds along its own single fixed RF channel.

The packet style data sent by the RF transmitters to the RF receiver is typically 58 to 69 bits, and tens to hundreds of milliseconds, in length, and the packet as a whole is repeatedly transmitted for as long as the user actuates the transmitter. Because these RF transmissions are sent on a fixed, single RF channel, RF noise in the channel causes reduced reception range, and the transmitter must often be actuated, and the packet data repeatedly transmitted, for extended periods of time to ensure the data is received. If the channel has heavy interference, then reception is completely blocked and the wireless system breaks down as the code-hopping scheme cannot mitigate RF noise in the channel.

Therefore, there is a need for a better system of wireless code communication, preferably for code hopping transmissions, to improve reception, security, and operation of barrier operator systems, that does not incur the disadvantages associated with single channel RF transmission.

SUMMARY

Accordingly, the present invention is directed to channel switching remote controlled barrier operator systems, and methods of operation therefor, in which data packets are transmitted along alternately switched channels between the transmitter and receiver, to avoid the noise and interference of any one channel. In a preferred mode, the system exhibits asynchronous wireless transmission and receipt of multiple copies of the transmitted data packets, for example, multiple copies of a packet containing a rolling code, alternatively switched between two or more radio frequency channels. In one embodiment, the transmitter transmits more than two copies of the data message on each of two channels, while cycling from one channel to another at a rate governed by the number of packets transmitted on each of the channels. In another embodiment, the receiver cycles through all of the channels at a rate faster than a rate at which the transmitter cycles from one channel to another. In still other embodiments, the receiver tunes to each of the channels long enough to receive at least two sequentially transmitted copies of the message over each of the channels, or the barrier operator learns the transmitter by requiring receipt of at least two sequentially transmitted copies of the message on each of the channels, and thereafter responds to receipt of one copy of the message on any of the channels to initiate movement of the barrier. In yet another embodiment, receipt of packets from a previously learned single or dual channel transmitter can open a window of time for learning a different kind of transmitter. A previously learned dual channel transmitter can open a window of time for learning a single channel transmitter, and vice versa. Various modifications to these embodiments, as well as additional embodiments, will become readily understood by reference to the following detailed description, taken in conjunction with the accompanying drawings.

BRIEF DESCRIPTION OF THE DRAWINGS

FIG. 5(*b*) is a typical RF receiver timing diagram.

FIG. 6(*b*) is a flow diagram illustrating a method of operation of a transmitter for use in a channel switching remote controlled barrier operator system like that of FIG. 1.

FIG. 6(*c*), including FIGS. 6(*c*)(*i*)-6(*c*)(*iii*), is a flow diagram illustrating a method of operation whereby a receiver learns a transmitter for use in a channel switching remote controlled barrier operator system like that of FIG. 1.

DETAILED DESCRIPTION

Figure 1:
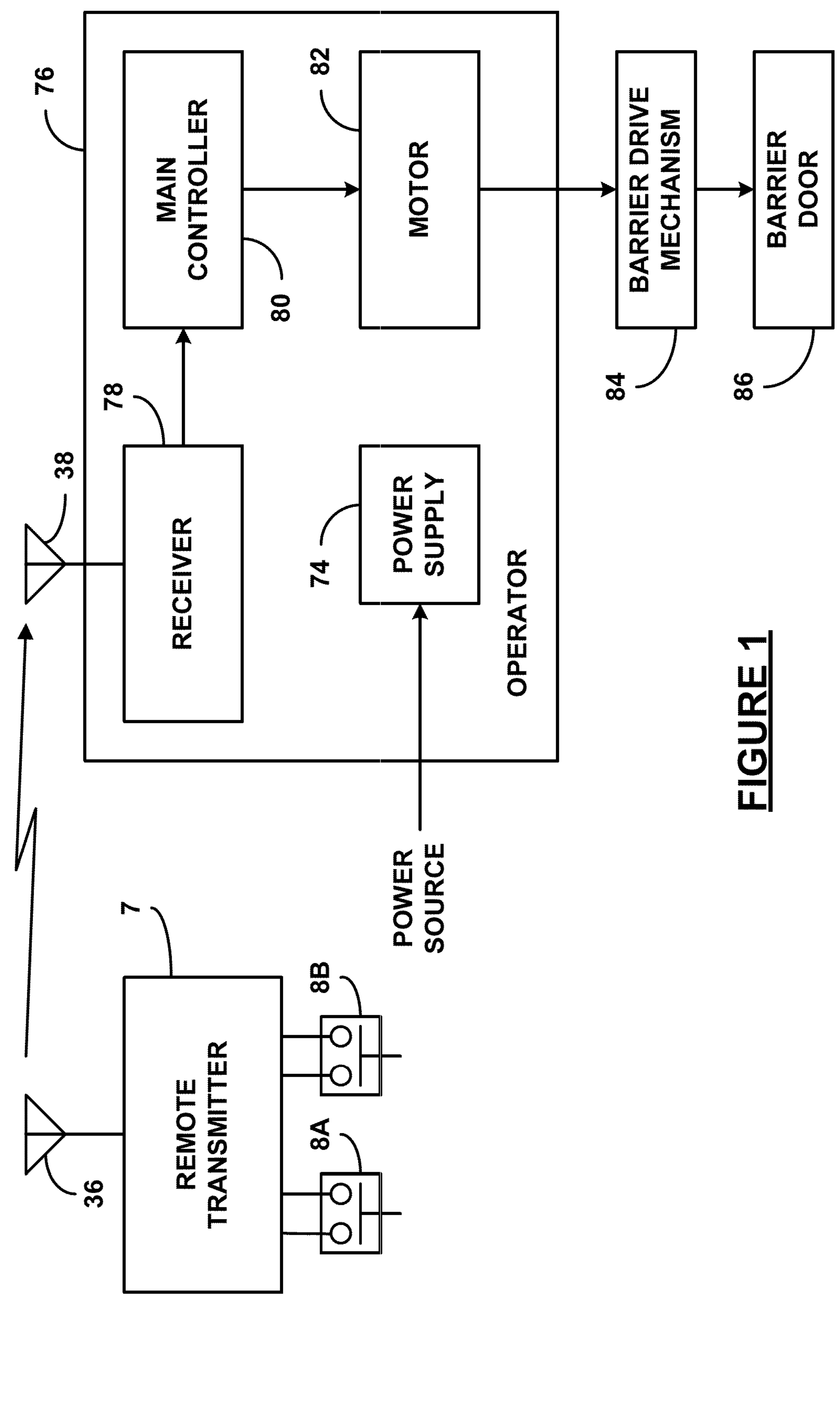
FIG. 1 is a block diagram of the components of the channel switching remote controlled barrier operator system in accordance with one form of the invention.

In the following description, like elements are marked throughout the specification and drawings with the same reference numerals, respectively. The drawing figures are not to scale and certain elements are shown in generalized or schematic form in the interest of clarity and conciseness. It should be understood that the embodiments of the disclosure herein described are merely illustrative of the principles of the invention.

The following description contemplates an improved barrier operator system utilizing a wireless communication system which includes the transmission and reception of the packet of coded information, specifically a multibit rolling code, by RF channel switching. Certain embodiments contemplate sending two or more redundant data packets on each RF channel prior to switching channels. Once the remote RF transmitter is released and activated again, the rolling code then changes and new redundant data packets are transmitted again over the same RF channels.

Also contemplated are barrier operator systems that entail a learned code, where the receiver must receive two or more rolling code hopping data packets on all RF channels designated for channel switching before the transmitter can be learned to the receiver. In certain embodiments, however, once the transmitter is learned, the receiver only needs to receive just one valid data packet on any one of the RF channels before executing the transmitted command.

In accordance with one feature of an embodiment of the invention, the RF receiver, in its operating mode, can scan all of the two or more RF channels at a rate faster than the RF transmitter changes from one RF channel to the next RF channel. This practice ensures that the RF receiver will detect data packets on the first pass for that RF channel. Because the RF receiver scan rate is running asynchronously from the RF transmitter's channel switching, the RF receiver scan rate can be changed at any time to a new rate to allow the receiver to detect two or more of the redundant data packets for any one RF channel.

Other features of the invention include the ability of the RF transmitters to be backward compatible to older fixed channel RF receivers by reducing the channel-switching rate. Embodiments incorporating such a feature are particularly advantageous because there is a large install base of existing automobiles with fixed channel Homelink systems owned by consumers in this market.

The advantages of the various embodiments of the invention are particularly relevant where multiple barrier operator systems are often found in commercial or industrial applications where the operators are in close proximity to one other. Here, the channel switching protocol improves transmission efficiency by better mitigating the effects of RF interference. The disclosure further depicts how the channel switching protocol better mitigates out of band signals, making communication more robust.

Referring initially to FIG. 1, the major functional blocks of the barrier operator system include a remote RF transmitter 7, a barrier operator 76, a barrier drive mechanism 84 and the barrier (door) 86. A power supply 74 powers the components of the barrier operator 76. While FIG. 1 shows only one of each type of device typically used in a movable barrier system, it should be understood that there could be multiples of any of the devices in a given application. For example, it is very common in both residential and industrial environments to have multiple operators moving multiple barriers.

In a garage door operator system, for example, the remote transmitter 7 can be of the handheld type, or an integral part of a wall module in the interior of the garage, or affixed to the exterior wall for keyless operation. Wireless communication systems of this nature usually transmit in the ultra high frequency (UHF) range and use low cost means of modulation like ASK or FSK. However, in theory, any carrier frequency could be used so long as it can support the transmitted data rate. It should be understood that any modulation type can be used that can send the digital data required. The remote transmitter 7 has a radiating element or antenna 36 and push button switches 8A and 8B that the user pushes to activate the remote RF transmitter 7 and send a command via a hopping code data packet associated with that push button. In this case the buttons are typically associated with opening and closing the barrier 86.

The barrier operator 76 includes an RF receiver 78, a main controller 80, and an electric motor 82 that powers the barrier 86 between the open and close positions via the drive mechanism 84. In this example, hopping code data packets are sent by the transmitter 7 to the receiver 78 on one or more RF channels.

Figure 4:
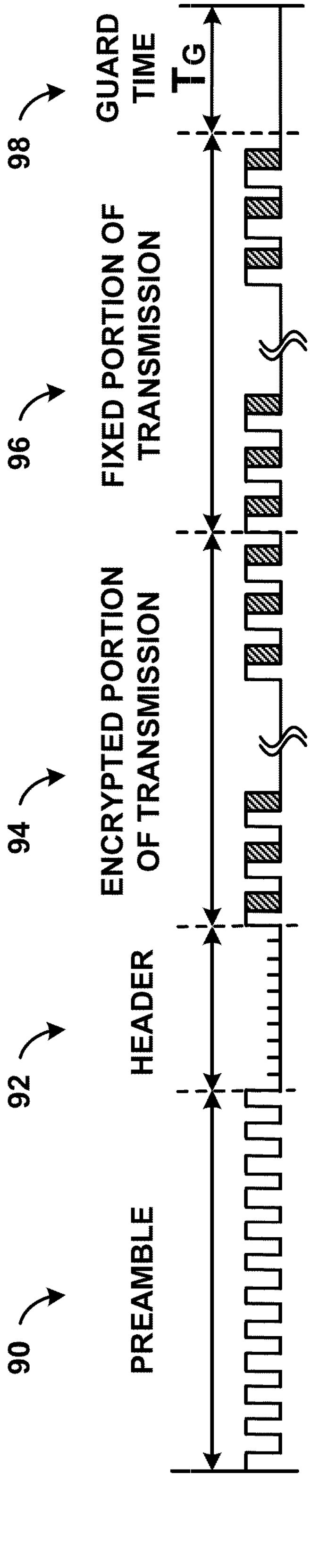
FIG. 4 is a typical hopping code data packet diagram.

The contents of the transmitted hopping code data packets typically include the transmitter's identification code, push button command, and hopping code portion, as shown in FIG. 4. Data packets are continuously sent for as long as the user presses and holds down push button 8A or 8B. Once the user releases the push button 8A or 8B, the transmission typically stops within a second. Then, the next push of the same button sends new data packets with the same transmitter's identification code and push button command, but with a different rolling code portion for security. The transmitter automatically and alternately changes the frequency of transmission along the pre-determined frequency channels as the user holds down the push button. Depending upon the timing of the system, the packet length, and the length of hold on the push button, not all of the RF channels may be used for transmitting. Typically, transmission stops when the user recognizes that the operator 76 has received the intended command sent by the transmitter 7. The user stops the transmission by simply taking his/her finger off the push button 8A or 8B.

The heart of the operator 76 is its main controller 80, preferably provided by a microcontroller, which monitors the valid commands decoded by the receiver 78 and has its own memory in which to store instructions and data. The controller 80 decides, inter alia, if and when to instruct the opening, closing, or stopping of the barrier 86. Typically in garage door openers, the main controller 80 also monitors other devices, such as the lights, wall buttons or consoles, entrapment devices, sensors, and other communication links. The main controller 80 does not typically control the operational characteristics of the receiver 78, as the receiver 78 typically has its own micro-controller. The controller 80 receives commands from the receiver 78 as to what task to perform. However, it is not unusual for an operator to have just one microcontroller that performs all the needed functions. Alternatively, the barrier operators may have, instead of a micro-controller, hardwired circuitry to perform the needed tasks.

Figure 2:
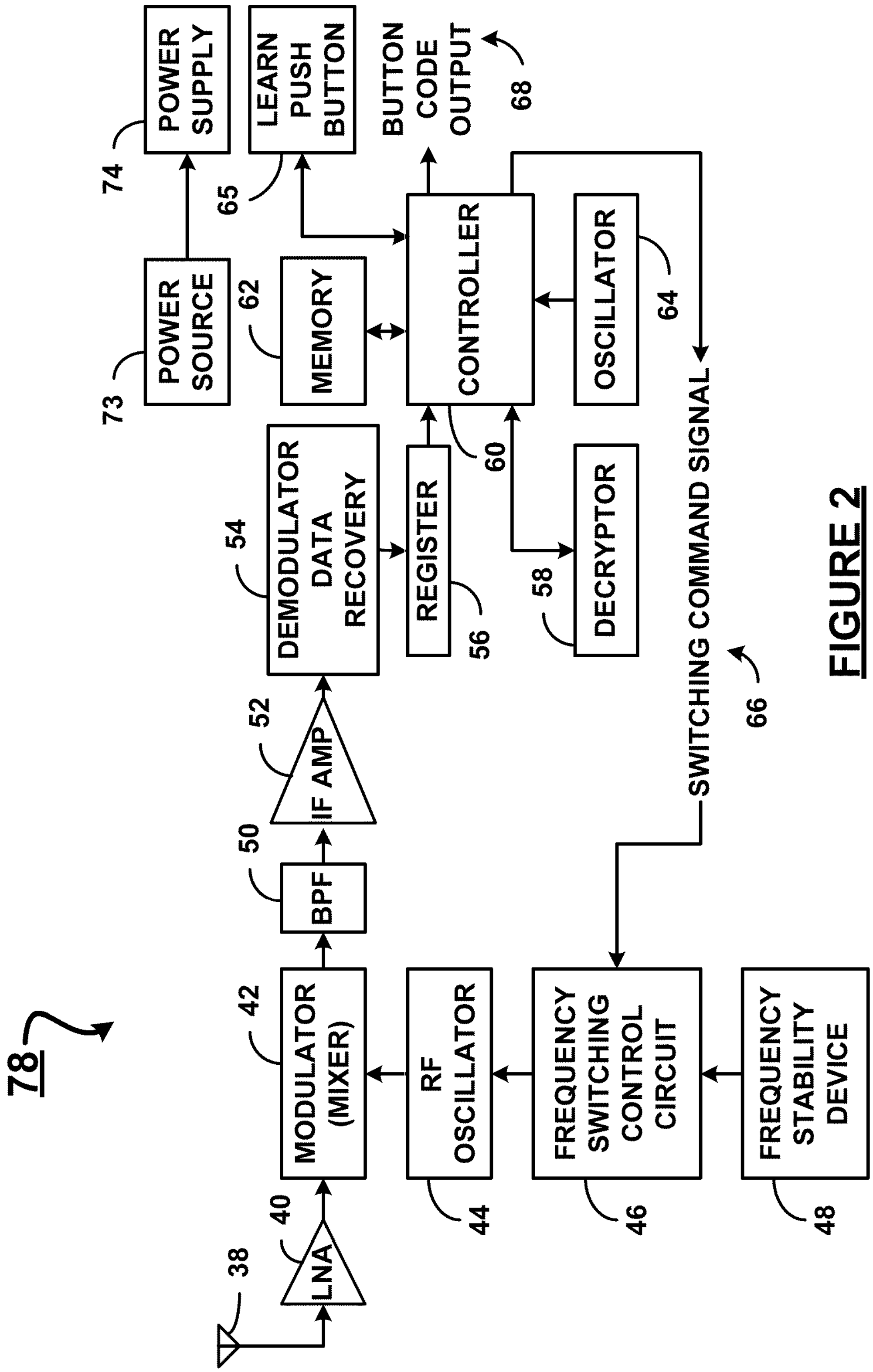
FIG. 2 is a block diagram of a receiver for use in the system of FIG. 1.

The receiver 78, which receives the wireless data for the operator 76, is shown in greater detail in FIG. 2. Power supply 74 of the barrier operator supplies power from power source 73 to the receiver components. Although there are many architectures that could be used for receiver 78, one common type is a single conversion super heterodyne type as shown in FIG. 2. In this type of receiver, only a single mixer or modulator 42 is used to down convert the RF signal to an intermediate frequency (IF) signal prior to amplification by the IF amplifier 52. The RF signal is picked up by the antenna 38 and amplified by the low noise amplifier 40 before entering the modulator 42. The modulator 42 requires a local RF oscillator signal 44 in order to perform the function of down conversion.

RF receivers receive signals from multiple incoming frequency channels by changing the frequency of the local RF oscillator 44 signal as the IF signal is produced by the mixing (multiplication) of the incoming RF signal and the local RF oscillator signal. A band pass filter (BPF) 50 is typically used to filter out the unwanted signals produced by the multiplication effect.

The changing of the output frequency of the local RF oscillator 44 is performed by the frequency switching control circuit 46. The control circuit 46 may be of any suitable construction, one suitable device being an electrical circuit device known as a phase lock loop. Frequency stability of the RF oscillator may be controlled by a frequency stability device 48, which can be a crystal or SAW device, or alternatively, an LC tuned circuit.

Any method for performing RF channel switching or changing is acceptable. For example, channel switching may be accomplished by changing one or more counter values in a phase lock loop, if used. The method of frequency change is irrelevant, but there must be some means of receiving the data, alternatively, over at least two different RF channels from the remote transmitter 7. The ability to receive data communication on multiple channels provides a means to mitigate interference noise that may exist at the time on any one RF channel. As a whole, this technique makes the wireless communication more robust by helping ensure that the receiver 78 receives the intended hopping code data packet by way of a clear channel, free of interference.

The receiver 78 includes a demodulator circuit 54 (FIG. 2) for removing the IF carrier and revealing the hopping code data packet. As the data in the packet is recovered, the data is shifted into shift register 56. The controller 60, through the use of the decryptor 58, oscillator 64, and memory 62, performs the task of verifying that the data received is a valid command from an authorized transmitter. Once verified, the controller 60 then forwards the recovered button code to the main controller 80 in the operator 76 for processing (FIG. 1). The main controller 80 reads the button code and translates it to a command for the operator.

Figure 3:
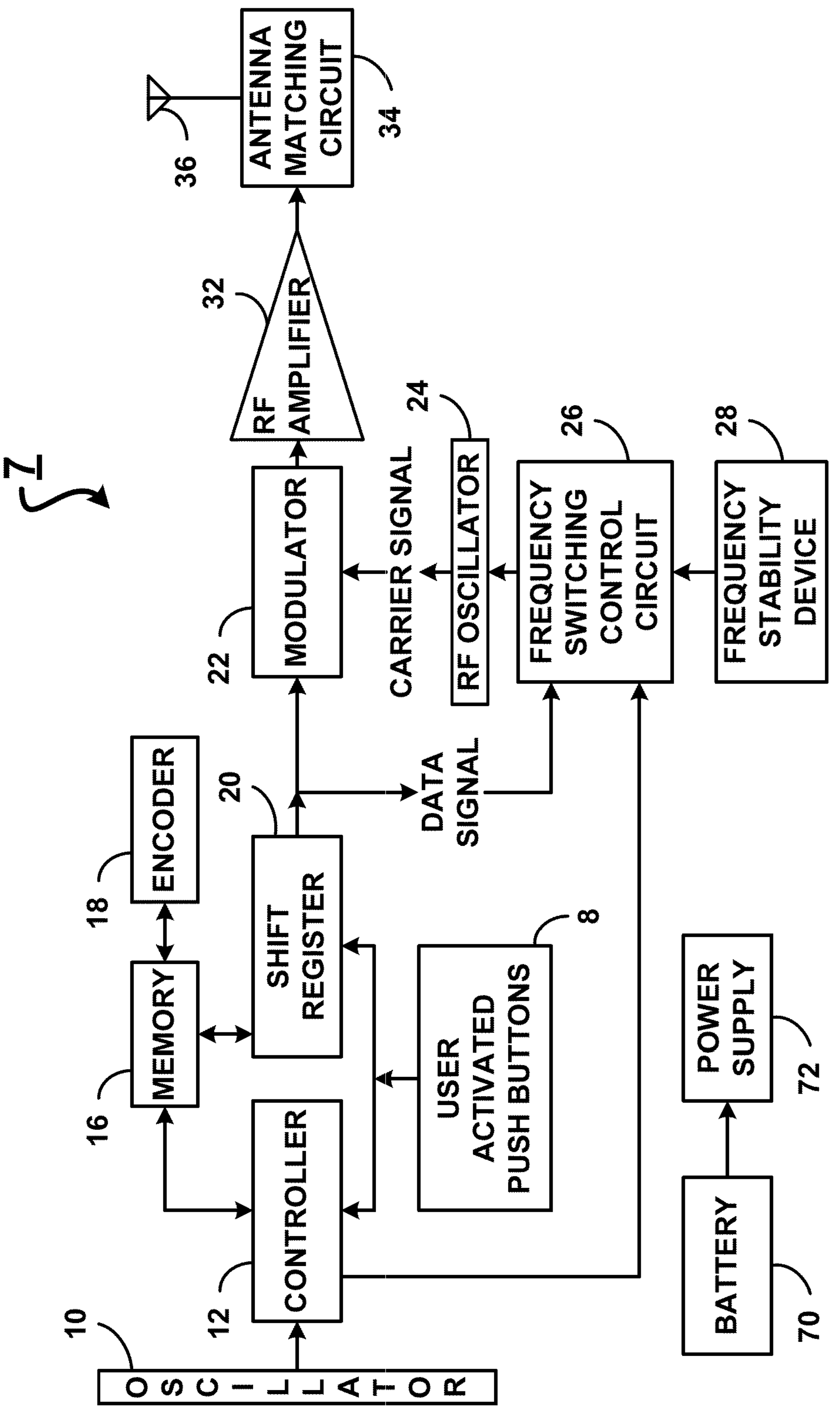
FIG. 3 is a block diagram of a wireless transmitter for use in the system of FIG. 1.

An example of an RF transmitter 7 suitable for the present system is depicted in FIG. 3. Accordingly, power supply 72 supplies power from a battery 70 to components of the transmitter. The RF transmitter 7 has a radiating element or antenna 36, which is connected to a RF amplifier 32 by way of a matching circuit 34. The RF signal to be transmitted is created in the modulator 22, which performs the act of multiplying the baseband data packet (shown in FIG. 4) as created by the controller 12 (FIG. 2) together with a local RF oscillator 24. RF oscillator 24 obtains its reference from a frequency stability device 28. Typically, frequency stability devices can be crystals, SAW resonators, or an LC tuned circuit.

The capability of the transmitter 7 to switch frequency is performed by the frequency switching control circuit 26, which changes the frequency of the RF oscillator 24 in response to a control signal from the controller 12 or, alternatively, in response to the data signal which is also inputted to modulator 22. For example, the data signal can be used where the data packets to be transmitted can be distinguished from one another in a way such that they can be counted. In accordance with that technique, the frequency switching control circuit 26 needs only to count the requisite number of data packets being generated by the controller 12 and then automatically switch frequencies.

The RF transmitter 7 (FIG. 2) also uses an oscillator 10 (FIG. 3) to create a clock for the controller 12. The encoder 18 and the shift register 20 are needed to properly assemble the hopping code data packets and prepare them to be modulated onto an RF carrier by the modulator 22.

FIG. 4 schematically illustrates the structure of a typical hopping code data packet. The packet has five different sections, namely the preamble 90, the header 92, the encrypted rolling or hopping code portion 94, the fixed portion 96, and the guard time portion 98. The preamble 90 typically comprises a short series of pulses used to set up the receiver's data slicers (not shown) in the demodulator 54 (FIG. 2). The header 92 (FIG. 4) is a period of time in which there are zero pulses, prior to the commencement of the data portion of the packet. Following the header 92 are the encrypted portion 94 and fixed (non-encrypted) portion 96. The guard time 98 is the increment of time before another packet can be sent. Guard time 98 can also be described as the time between packets and can be as long or longer in time as all four previous sections combined. For example, Microchip Technology Incorporated, a corporation having its principal place of business in Chandler, Ariz., has a hopping code data format that is part of their Keeloq system that is 66-bits in the payload section, with a total packet time of 100 msecs, yet the guard time is about 50 msecs. Keeloq systems are usually pulse width modulated systems with bit symbol times of 600 usec. Linx Technologies has a hopping code system called "CypherLinx," in which the data to be transmitted is combined with a 40-bit counter and 80 bits of integrity protection before being encrypted to produce a 128-bit packet. Guard times between CypherLinx packets are shorter than Keeloq (e.g., typically less than 10 msecs).

Regardless of the format of the data packets, there are notable similarities in most one way code hopping communication systems. One similarity is that there is no error correction within a packet. This lack of error correction means that the transmitter often sends more than one redundant packet consecutively, so that verification of the packet can occur at the receiver. Another similarity in all code hopping one way communication systems is that there is no exchange of security keys as is typical in two-way communication systems, like Bluetooth and ZigBee. Therefore the remote transmitter is first learned (or paired) during a "learning mode" to a specific receiver before commands are sent to the receiver.

The aforementioned learning mode is typically entered into by pressing the learn button 65 (FIG. 2) on the receiver 76 (FIG. 1) prior to pushing either of buttons 8A or 8B on the transmitter 7 to then be learned. During the learn mode, the transmitter is keyed by the user to send out redundant data packets which contain the transmitter's identification number and secret decryption key. The RF receiver 76 then stores these numbers into its memory 62 (FIG. 2). By storing the transmitter's identification number and secret key, the RF receiver 76 (FIG. 1), which shares the same secret key, has now learned the remote RF transmitter 7. The receiver learns other remotes by repeating the same process.

The learning process of code hopping systems, like Keeloq and CypherLinx, are typically performed on one carrier radio frequency of operation and implemented without regard to the number of redundant packets being sent by the transmitter. The receiver, upon learning a transmitter, typically exits the learn mode and then automatically returns back to its normal operating mode.

The receiver, while in the "learn mode," receives valid data packets on two or more of the channels on which the remote transmitter is transmitting because the disclosed transmitter is switching frequencies asynchronously. According to certain embodiments of the disclosed system, two or more valid data packets must be received on each RF channel before a transmitter can be learned to the receiver. This requirement greatly improves the robustness of the one way wireless communication system during the learn mode. It is possible, however, and desirable, at times, to allow the learning of a single channel transmitter to a receiver immediately after learning a switching transmitter to that same receiver. This learning may need to be performed at close range and within a short window of time.

Another characteristic of certain embodiments of the disclosed system is the ratio of the scanning rate of the receiver to the switching times of the transmitter. In order for the receiver to quickly acquire and process a transmission, whether in the learn mode or operate mode, the receiver scans all transmitter channels with a rate as fast or faster than a transmitter dwells on one channel and while switching to the next. It is also envisioned that, once out of the learn mode, the receiver only needs to receive a single valid data packet on any one of the transmitter RF channels to process the command in the data packet.

Figure 5A:
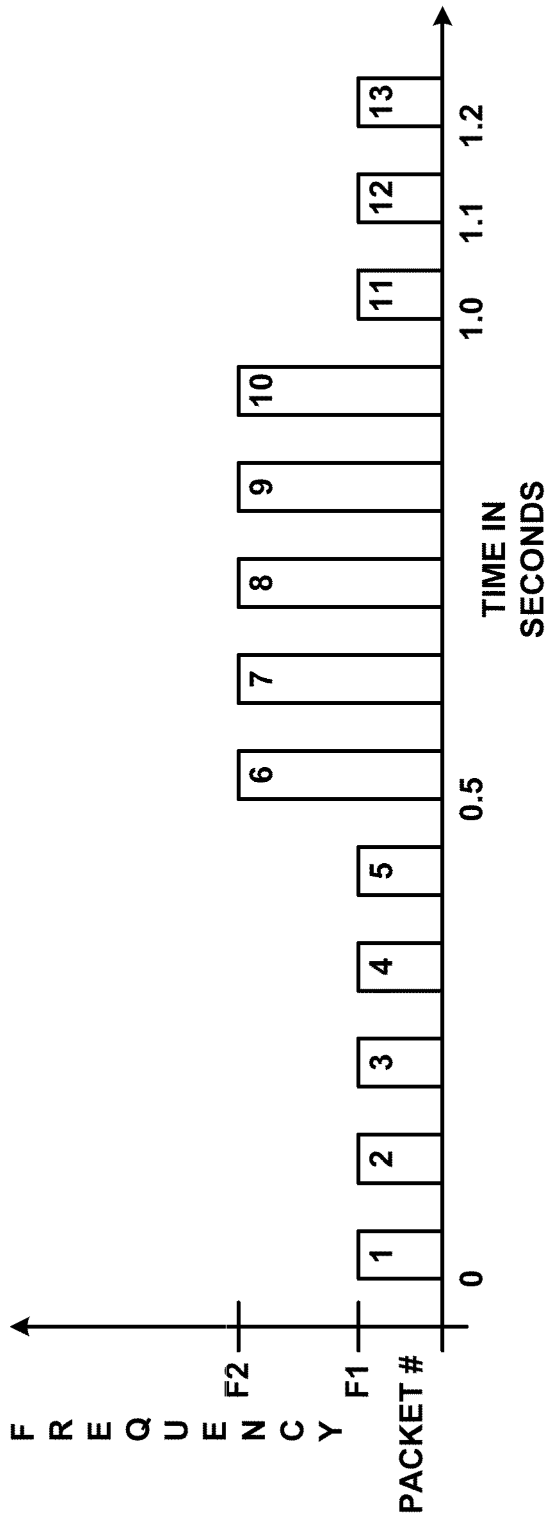
FIG. 5(*a*) is a typical RF transmitter timing diagram.
Figure 5B:
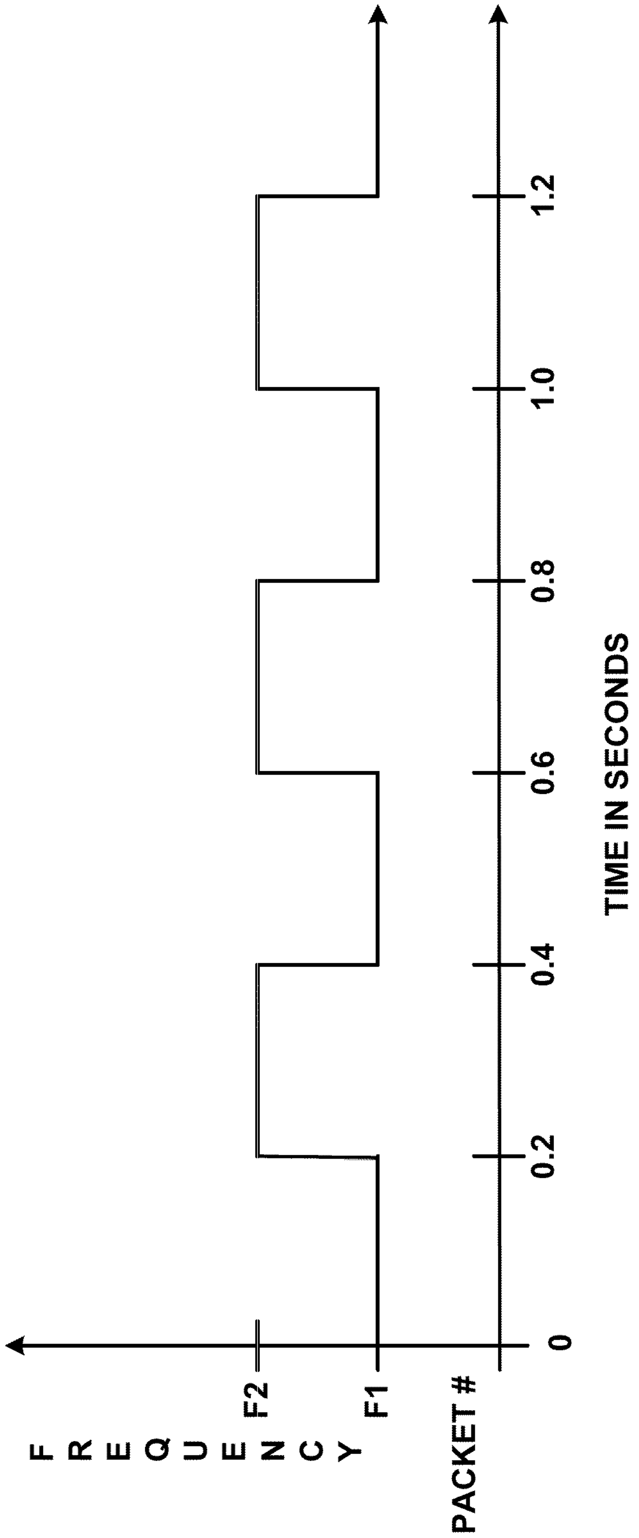

An example of a receiver-scanning rate based upon a transmitter-switching rate is depicted in FIG. 5. In FIG. 5(*a*), the transmitter is switching between two RF channels shown as frequencies F1 and F2. The transmitter is also sending five data packets, each with a length of 100 msec on both frequencies. In other words, the transmitter sends five 100 msec data packets on frequency F1, followed by five more 100 msec data packets on frequency F2, for a total two-channel transmission time of 1 second. The transmitter continues sending packets in this way until the button on the transmitter is released or until a period of predetermined transmission times out, or some combination of both.

In keeping with the example of FIG. 5(*a*), as shown in FIG. 5(*b*), the receiver scans or switches both channels within the dwell period of five data packets or, in this case, a total of 500 msec. To accomplish that goal, FIG. 5(*b*) shows the receiver scan rate with a dwell time of 200 msec for frequency F1, followed by 200 msec of dwell time for F2, before going back to F1. The receiver repeats this scanning rate between the two frequencies until it detects a data packet on one of the two channel frequencies.

It is also envisioned that the receiver will dwell on a frequency once data is sensed on that frequency. For example, if the receiver does not see the beginning of a data packet, it can dwell on that frequency until such time that full data packets are received and a proper decode can be made. If the receiver determines that the signal is not a valid data packet from a learned transmitter, the receiver can then revert back to its normal scanning rate. If the receiver cannot correctly read and recognize the incoming baud rate or see the appropriate time of the header (e.g., header time of zeros), the receiver can again return back to its normal scanning rate.

Figure 6A:
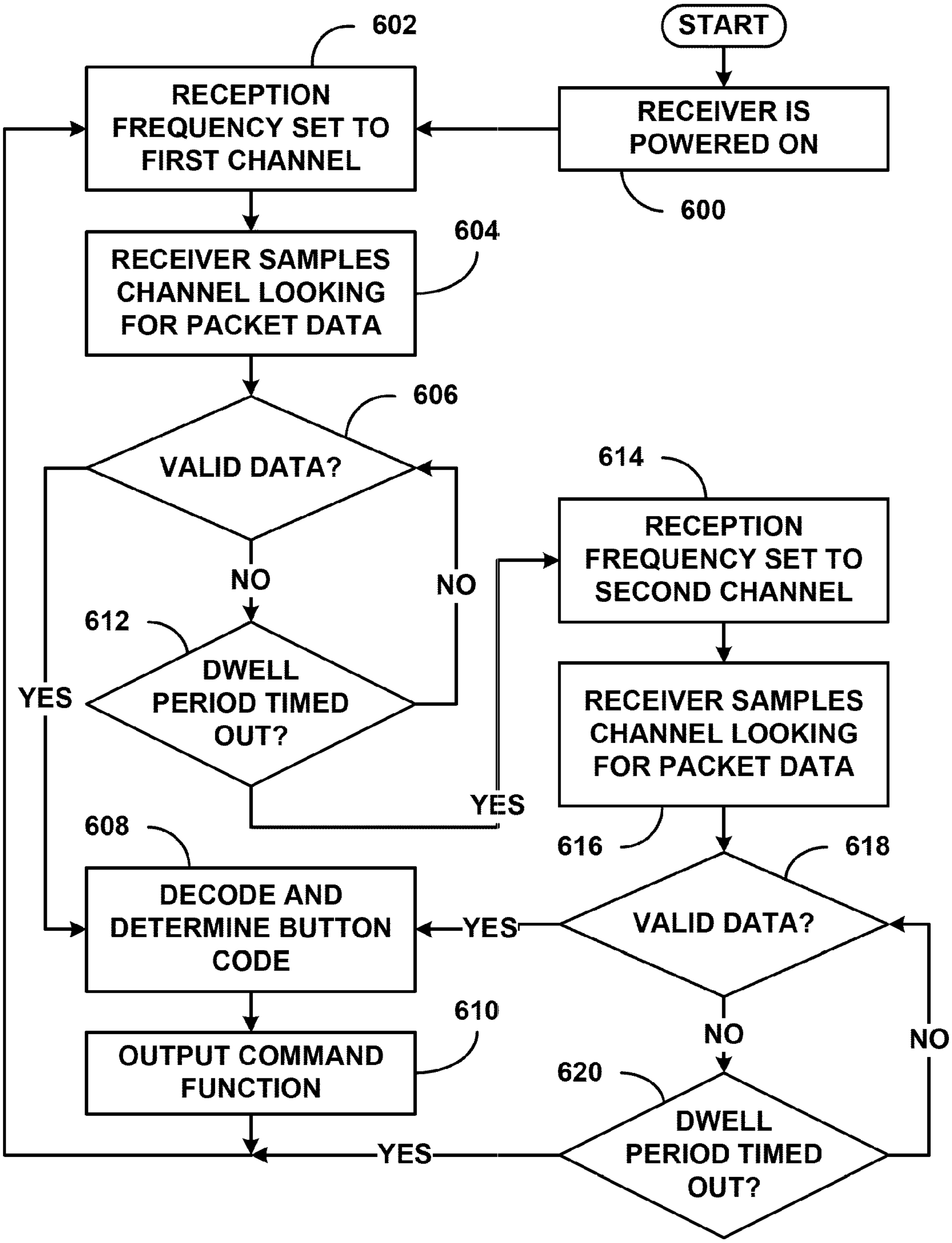
FIG. 6(*a*) is a flow diagram illustrating a method of operation of a receiver for use in a channel switching remote controlled barrier operator system of FIG. 1.
Figure 6B:
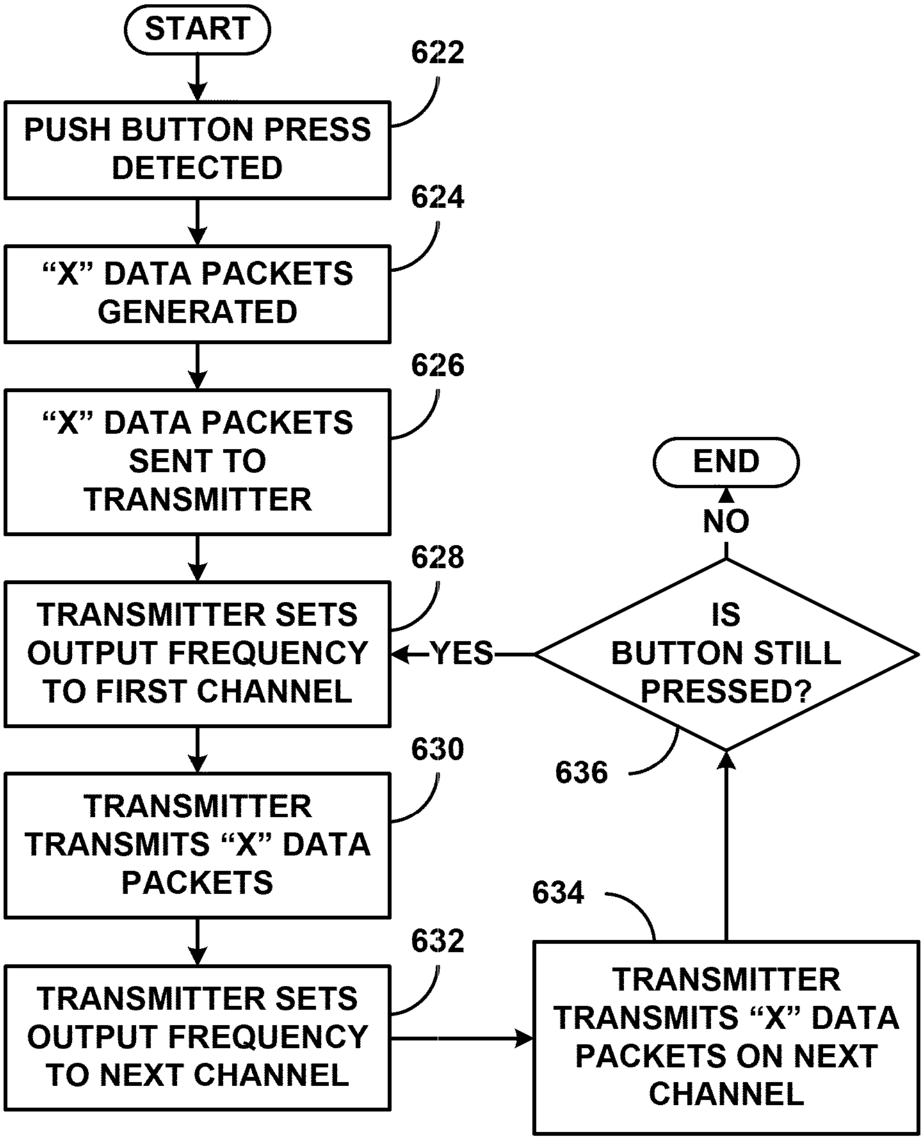
Figure 6C:
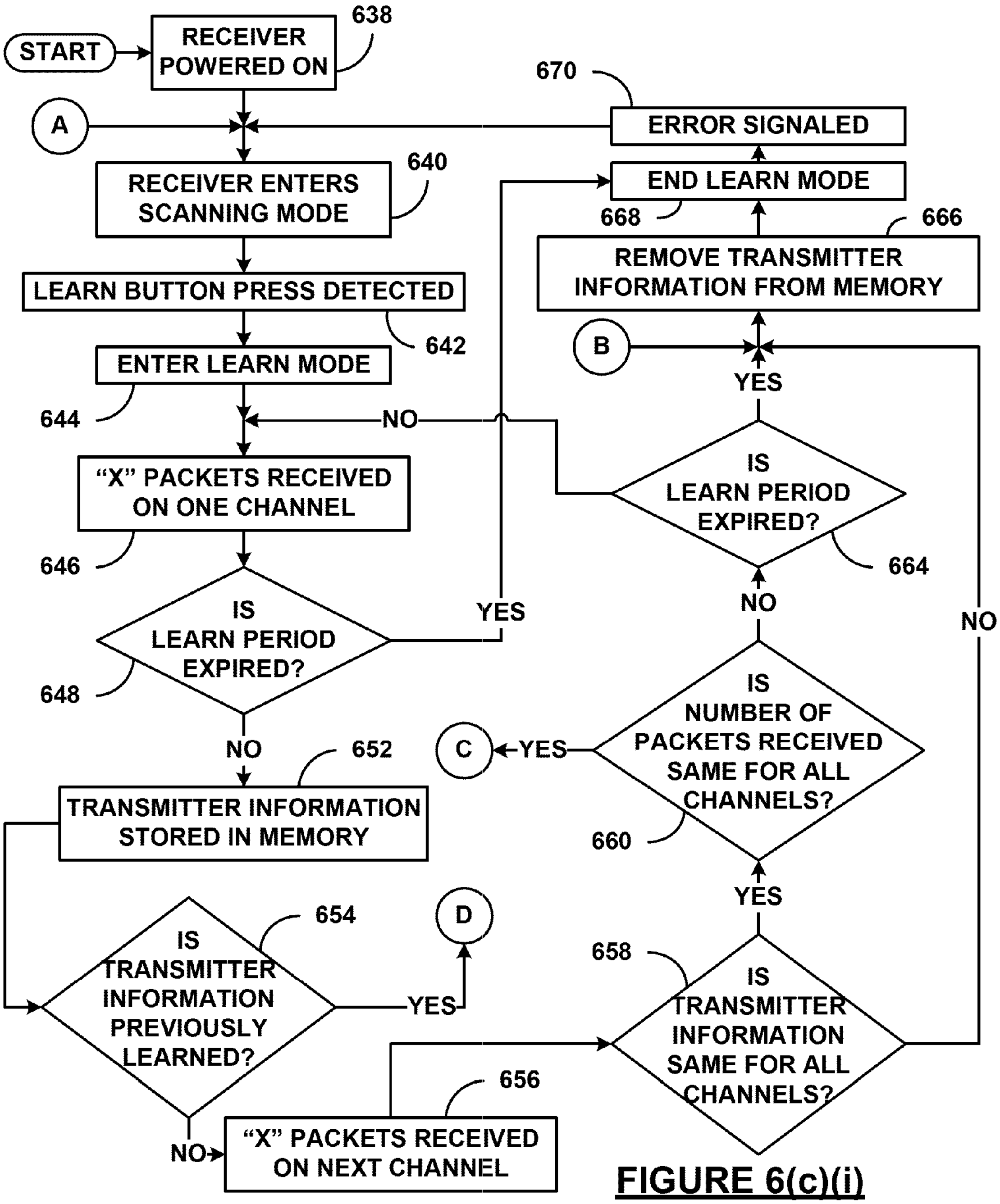

Turning now to FIG. 6, methods of operation for various components of a channel switching remote controlled barrier opening system are provided. For example, FIGS. 6(*a*) and 6(*b*) respectively provide methods of operation for a barrier operator receiver unit and a remote control transmitter unit. Further, FIG. 6(*c*) provides a method of operation for the receiver unit to learn a dual frequency transmitter in response to pressing of a learn button, for example, on the barrier operator head unit, wall unit, or remote control unit, followed by receipt of valid packets from the transmitter on multiple frequencies. FIG. 6(*c*) also provides a method of operation whereby the receiver unit can respond to actuation of the learn button and receipt of packets from a previously learned, multiple frequency transmitter by opening a window of time in which another type of transmitter, such as a legacy, single frequency, transmitter, can be learned by the receiver upon receipt of packets from that transmitter.

Beginning with FIG. 6(*a*), the method of operation for the receiver unit begins with powering on of the receiver at step 600. The reception frequency is then set to a first channel at step 602, and the receiver samples that channel looking for packet data. If it is determined at step 606 that valid packet data has been received, then the valid packet data is decoded at step 608, a corresponding function command is output at step 610, and processing returns to step 602. In some embodiments, outputting of the function command at step 610 can cause the barrier operator to initiate movement of the barrier. However, if a dwell period times out at step 612 before receipt of valid packet data has occurred, then the reception frequency is set to a second channel at step 614. Then, the receiver samples the second channel looking for valid packet data at step 616. If it is determined that valid packet data has been received at step 618, then processing proceeds to step 608. However, if another dwell period times out at step 620 before receipt of valid packet data has occurred, then processing returns to step 602.

Although only two channels are demonstrated, it should be readily understood that additional channels can be included. Also, it should be understood that the aforementioned dwell periods are periods of time for the receiver to dwell on a channel, and that these dwell periods can be different in length or identical in length. These dwell periods can also be predetermined or dynamically determined. In some embodiments, the dwell periods can be predetermined to be long enough to ensure opportunity to receive at least two copies of a packet transmittable over a channel by remote control transmitter devices of a target category, and not equal to an amount of time required by the remote control transmitter devices of the target category to transmit a predetermined number of copies of the packet on a channel before switching to another channel. In alternative or additional embodiments, the dwell periods can be predetermined to ensure that the receiver cycles through all of the multiple channels at a rate faster than the transmitter cycles from the current one of the multiple channels to the next one of the multiple channels.

Turning now to FIG. 6(*b*), the method of operation for the transmitter device begins at step 622, in which the push button press is detected. In response, a number of data packets are generated at step 624 and sent to the transmitter at step 626. It should be understood that a predetermined integer number of identical packets greater than or equal to two can be generated. For example, five identical packets can be generated. The transmitter sets the output frequency to a first channel at step 628, and the packets are transmitted over that channel at step 630. Next, the transmitter sets the output frequency to a next channel at step 632, and the transmitter transmits the packets over the next channel at step 634. After that, if it is determined that the button is still pressed at step 636, then processing returns to step 628. Otherwise, the method ends. Although two channels are demonstrated, it should be readily understood that additional channels can be included for transmission of the two or more identical packets over each of the channels in sequence.

Form the foregoing, it should be understood that an embodiment of the transmitter can transmit five identical packets on one channel, transmit the five identical packets on another channel, and then cycle between the two channels as long as the transmitter button is actuated. In a complementary fashion, the receiver can receive over each of the two channels for a period of time long enough to receive two packets over each of the two channel, but not long enough to receive two and one-half packets over each of the two channels. In this embodiment, the receiver cycles through the set of channels at a rate faster than is required for the transmitter to transmit all five packets over one of the channels. Thus, the receiver will have an opportunity to receive two or more packets over the channel being utilized by the transmitter before the transmitter switches to the next channel. Accordingly, unless there is interference on the channel first utilized by the transmitter, valid packets should be received by the receiver on that channel before the transmitter switches to the next channel. However, alternative embodiments can implement other schemes, such as dwelling of the receiver at each frequency for a period of time long enough to permit the transmitter to cycle through all of the channels in the sequence.

Turning now to FIG. 6(*c*), the method of learning transmitters to a channel switching receiver unit begins at step 638 with powering on of the receiver. Next, the receiver enters the scanning at step 640. This scanning mode proceeds according to the method of FIG. 6(*a*). However, if a learn button press is detected at step 642, then a learning mode is entered at step 644. Then, a predetermined integer number of two or more identical packets can be received on a channel at step 646. However, if a learning period expires at step 648 before receipt of the predetermined number of packets on the channel, then the learning mode ends at step 668, error is signaled at step 670, and processing return to step 640. Otherwise, upon receipt of the packets, transmitter information of the packets is stored in memory at step 652. At this point, a determination is made at step 654 whether the transmitter information is a match to that of a previously learned transmitter. If not (i.e., the transmitter is not one that has already been learned), then one or more other channels are scanned in order to receive the packets again on the other channel or channels at step 656. At this point, if the packets are not received before expiration of the learn period at step 664, or if the transmitter information received over both channels is not determined to be a match at step 658, or if the number of packets received over all channels is determined to differ at step 660, then learning does not occur. Instead, the transmitter information is removed from memory at step 666, the learn mode is ended at step 668, error is signaled at step 670, and processing returns to step 640. Otherwise, a transmitter learn confirm mode is entered at step 672.

In the transmitter learn confirm mode another attempt is made to receive packets from the transmitter at step 674. At this point, the receiver is looking for packets generated by a second press of the transmitter button. Here, the packets received will be different than those previously received because they will contain a different rolling code than the previously received packets. A determination is made whether those packets were generated by the same transmitter that generated the packets that were previously received. Accordingly, if the packets are determined at step 676 to be received before expiration of a learn period for the learn confirm mode, and if the transmitter information in the new packets is a match to that stored in the memory, then the transmitter information is written into permanent memory at step 680. At this point, the transmitter is learned, so a learn confirm signal is generated at step 682. Thereafter, the learn mode is ended at step 684, and processing returns to step 640. Otherwise, if the learn period expires or if the transmitter information is not correct, then transmitter information is removed from memory at step 666, the learn mode ends at step 668, error is signaled at step 670, and processing returns to step 640.

On the other hand, if it is determined at step 654 that the transmitter information matches that of a known transmitter, then a window is opened at step 686 for learning of a different kind of transmitter, such as a legacy, single-frequency transmitter. Here, the combination of a learn button press and press of a button on a previously learned channel switching transmitter authorizes, for a period of time, learning of a different kind of transmitter. At this point, the receiver enters a scanning mode at step 688 to look for valid packet data on any of multiple channels over which the transmitter might transmit. If valid packet data is not received on one of the channels at step 690 before expiration of a learn period at step 692, then an error is signaled at step 694, and processing returns to step 640. Otherwise, the transmitter information from the valid packet data is stored in the memory at step 696, the receiver reenters scanning mode to look for a second transmitter actuation at step 698, and the receiver enters a transmitter learn confirm mode at step 700. Here, the receiver is looking for packets that are different from those previously received because they contain a different rolling code, but that nevertherless contain the same transmitter information. Thereafter, if valid packet data is not received at step 702 before expiration of a learn period at step 704, or if transmitter information in such packets is not a match for the transmitter information just stored in memory at step 696, then transmitter information is removed from memory at step 666, the learn mode ends at step 668, error is signaled at step 670, and processing returns to step 640. Otherwise, the transmitter information is written into permanent memory at step 708, and a learn confirm signal is generated at step 710. Afterwards, the learn mode ends at step 712, and processing returns to step 640.

In the learning method just described, it should be readily recognized that a channel switching transmitter can only be learned if the learn button is pressed, valid packets are received from the transmitter on more than one channel, and valid packets are again received from a second actuation of the same transmitter on at least one channel. In some embodiments, determining that the packets are valid might require that at least two packets be received over each channel. It should also be understood that the single channel transmitter can only be learned if the learn button is pressed, valid packets are first received from a previously learned transmitter, and valid packets are subsequently received from two actuations of the new transmitter. Thereafter, the receiver can scan multiple frequencies and output commands received over any one of the channels from either type of transmitter. However, the channel switching transmitter can have an advantage over the single channel transmitter in successfully delivering packets to the receiver even when there is interference on the channel utilized by the single channel transmitter.

The foregoing description is of exemplary and preferred embodiments of channel switching remote control barrier operator systems and methods. The invention is not limited to the described examples or embodiments. Alterations and modifications to the disclosed embodiments may be made without departing from the spirit and scope of the appended claims.

What is claimed is:

1. A channel switching remote controlled barrier opening system, comprising:

a transmitter operatively connected to:

(a) perform iterative, sequential setting of an output frequency of a transmitter to multiple channels; and (b) on each of the channels, perform transmission of multiple copies of a message before tuning of the transmitter, at a transmitter-switching rate, to a next one of the multiple channels;

a receiver operatively connected to:

(a) perform iterative, sequential setting of a reception frequency of the receiver to the multiple channels at a receiver scan rate that is faster than the transmitter-switching rate; and (b) over each of the multiple channels, receive data for a period of time greater than that required for transmission of exactly one copy of the message; and (c) learn said transmitter by requiring successful receipt of at least two sequentially transmitted copies of the message on each of the multiple channels; and (d) respond to receipt of packets from said transmitter during a learn mode by determining whether said transmitter is already learned and, if so, opening a window of time during which another type of transmitter can be learned by temporarily lifting the requirement for successful receipt of at least two sequentially transmitted copies of the message on each of the multiple channels; and a barrier operator operatively connected to operate a device at least in part in response to receipt of a copy of the message on any of the multiple channels.

2. The system of claim 1, wherein another period of time required by said receiver to receive the data over all of the channels is briefer than that required by said transmitter to perform the transmission of the multiple copies of the message on one of the multiple channels.

3. The system of claim 1, wherein said transmitter and said receiver are operated to iteratively, sequentially switch between exactly two channels.

4. A channel switching remote controlled barrier opening apparatus, comprising:

a transmitter operatively connected to transmit copies of a message while iteratively cycling through multiple channels at a transmitter-cycling rate, wherein cycling to a next channel in a sequence of the multiple channels is triggered by transmission of a predetermined number of at least two copies of the message on a current one of the multiple channels;

a receiver operatively connected to iteratively cycle through the multiple channels at a scan rate calculated to ensure capability of the receiver to receive at least two copies of the message on each one of the multiple channels, wherein the scan rate is faster than the transmitter-cycling rate;

a remotely controlled barrier operator operatively connected to be responsive to receipt of at least one copy of the message by the receiver to trigger an operation of the barrier operator;

wherein the receiver is operatively connected to learn the transmitter to the receiver by requiring successful receipt of at least two sequentially transmitted copies of the message on each of the multiple channels; and respond to receipt of packets from said transmitter during a learn mode by determining whether said transmitter is already learned and, if so, opening a window of time during which another type of transmitter can be learned by temporarily lifting the requirement for successful receipt of at least two sequentially transmitted copies of the message on each of the multiple channels.

5. The apparatus of claim 4, wherein said receiver cycles through all of the multiple channels at a rate faster than said transmitter cycles from the current one of the multiple channels to the next one of the multiple channels.

6. A system comprising remote control transmitter for use with a channel switching remote controlled barrier opening system including a receiver, the transmitter comprising:

a modulator operatively connected to initially set an output frequency to a first channel;

a controller operatively connected to transmit multiple copies of a message containing a rolling code over the first channel; and a channel switching control circuit operatively connected to make a first determination whether a predetermined number of the multiple copies of the message have been transmitted over the first channel, and, in response to the first determination, cause said modulator to switch the output frequency to a second channel;

wherein said controller is operatively connected to transmit the multiple copies of the message over the second channel, and said channel switching control circuit is operatively connected to make a second determination whether the predetermined number of the multiple copies of the message have been transmitted over the second channel, and, in response to the second determination, cause said modulator to tune to the first channel;

the receiver is operatively connected to:

learn said transmitter by requiring successful receipt of at least two sequentially transmitted copies of the message on each of the multiple channels; and respond to receipt of packets from said transmitter during a learn mode by determining whether said transmitter is already learned and, if so, opening a window of time during which another type of transmitter can be learned by temporarily lifting the requirement for successful receipt of at least two sequentially transmitted copies of the message on each of the multiple channels.

7. The transmitter of claim 6, wherein said controller is operatively connected to transmit more than two copies of the message over each of the first channel and the second channel before said frequency switching control circuit completes the second determination.

8. A receiver for use with a channel switching remote control barrier opening system, the receiver comprising:

a modulator operatively connected to initially set a reception frequency to a first channel;

a controller operatively connected to receive data over the first channel; and a channel switching control circuit operatively connected to make a first determination whether a predetermined amount of time has passed since setting of the reception frequency to the first channel, wherein the predetermined amount of time is long enough to ensure opportunity to receive at least two copies of a packet transmittable over the first channel by remote control transmitter devices of a target category, and is less than to an amount of time required by the remote control transmitter devices of the target category to transmit a predetermined number of copies of the packet on a channel before switching to another channel, wherein said channel switching control circuit is operatively connected to cause said modulator to switch, in response to the first determination, to a second channel, said controller is operatively connected to receive data over the second channel, said channel switching control circuit is operatively connected to make a second determination whether the predetermined amount of time has passed since switching to the second channel, and, in response to the second determination, cause said modulator to switch to the first channel, and said controller is operatively connected to make a validity determination whether a valid rolling code has been received in a packet arriving over either the first channel or the second channel, and, in response to the validity determination, trigger an operation of a barrier operator of the channel switching remote controlled barrier opening system;

wherein the controller is operatively connected to learn a particular one of the remote control transmitter devices by requiring successful receipt of at least two sequentially transmitted copies of the message on each of the first channel and the second channel, and respond to receipt of packets from the transmitter device during a learn mode by determining whether the transmitter device is already learned and, if so, opening a window of time during which another type of transmitter device can be learned by temporarily lifting the requirement for successful receipt of at least two sequentially transmitted copies of the message on each of the multiple channels.

9. The receiver of claim 8, wherein the predetermined amount of time is further briefer than the amount of time required by the remote control transmitter devices of the target category to transmit the predetermined number of copies of the packet on the channel before switching to the other channel.

10. A method of operation for use with a channel switching remote controlled barrier opening system, the method comprising:

operating a transmitter, including:

(a) perform iterative, sequential setting of an output frequency of a transmitter to multiple channels; and (b) on each of the channels, performing transmission of multiple copies of a message before switching of the transmitter to a next one of the multiple channels at a transmitter-switching rate;

operating a receiver, including:

(a) performing iterative, sequential switching of a receiver to the multiple channels in a manner that is asynchronous with the switching of the transmitter at a receiver scan rate that is faster than the transmitter-switching rate; and (b) over each of the multiple channels, receive data for a period of time greater than that required for transmission of exactly one copy of the message; and (c) learning the transmitter to the receiver by requiring successful receipt of at least two sequentially transmitted copies of the message on each of the multiple channels; and (d) responding to receipt of packets from said transmitter during a learn mode by determining whether the transmitter is already learned and, if so, opening a window of time during which another type of transmitter can be learned by temporarily lifting the requirement for successful receipt of at least two sequentially transmitted copies of the message on each of the multiple channels; and operating a device at least in part in response to receipt of a copy of the message on any of the multiple channels.

11. The method of claim 10, wherein another period of time for receiving the data over all of the channels is briefer than that required for performing the transmission of the multiple copies of the message on one of the multiple channels.

12. The method of claim 10, wherein the transmitter and the receiver are operated to iteratively, sequentially switch between exactly two channels.

13. A method of operation of a remote control transmitter for use with a channel switching remote controlled barrier opening system including a receiver, the method comprising:

initially setting an output frequency to a first channel;

transmitting multiple copies of a message containing a rolling code over the first channel;

making a first determination whether a predetermined number of the multiple copies of the message have been transmitted over the first channel;

in response to the first determination, switching to a second channel;

transmitting the multiple copies of the message over the second channel;

making a second determination whether the predetermined number of the multiple copies of the message has been transmitted over the second channel; and in response to the second determination, switching to the first channel, the receiver learn said transmitter by requiring successful receipt of at least two sequentially transmitted copies of the message on each of the multiple channels; and respond to receipt of packets from said transmitter during a learn mode by determining whether said transmitter is already learned and, if so, opening a window of time during which another type of transmitter can be learned by temporarily lifting the requirement for successful receipt of at least two sequentially transmitted copies of the message on each of the multiple channels.

14. The method of claim 13, wherein transmitting the multiple copies of the message over the first channel and the second channel includes transmitting more than two copies of the message over each of the first channel and the second channel.

15. A method of operation of a receiver for use with a channel switching remote control barrier opening system, the method comprising:

initially setting a reception frequency to a first channel;

receiving data over the first channel;

making a first determination whether a predetermined amount of time has passed since setting of the reception frequency to the first channel, wherein the predetermined amount of time is long enough to ensure opportunity to receive at least two copies of a packet transmittable over the first channel by remote control transmitter devices of a target category, and is less than an amount of time required by the remote control transmitter devices of the target category to transmit a predetermined number of copies of the packet on a channel before switching to another channel;

in response to the first determination, switching to a second channel;

receiving data over the second channel;

making a second determination whether the predetermined amount of time has passed since switching to the second channel;

in response to the second determination, switching to the first channel;

making a validity determination whether a valid rolling code has been received in a packet arriving over either the first channel or the second channel;

in response to the validity determination, triggering an operation of a barrier operator of the channel switching remote controlled barrier opening system;

learning a particular one of the remote control transmitter devices by requiring successful receipt of at least two sequentially transmitted copies of the message on each of the first channel and the second channel; and responding to receipt of packets from the transmitter device during a learn mode by determining whether the transmitter device is already learned and, if so, opening a window of time during which another type of transmitter device can be learned by temporarily lifting the requirement for successful receipt of at least two sequentially transmitted copies of the message on each of the multiple channels.

16. The method of claim 15, wherein the predetermined amount of time is further briefer than the amount of time required by the remote control transmitter devices of the target category to transmit the predetermined number of copies of the packet on the channel before switching to the other channel.

* * * * *